(12) United States Patent
Hofmayr et al.

(10) Patent No.: US 11,858,538 B2
(45) Date of Patent: Jan. 2, 2024

(54) CABLE CAR AND METHOD FOR OPERATING A CABLE CAR

(71) Applicant: Innova Patent GmbH, Wolfurt (AT)

(72) Inventors: Christoph Hofmayr, Dornbirn (AT); Daniel Pfeifer, Sankt Anton am Arlberg (AT)

(73) Assignee: INNOVA PATENT GMBH, Wolfurt (AT)

( * ) Notice: Subject to any disclaimer, the term of this patent is extended or adjusted under 35 U.S.C. 154(b) by 1039 days.

(21) Appl. No.: 16/627,880

(22) PCT Filed: Jul. 2, 2018

(86) PCT No.: PCT/EP2018/067744
§ 371 (c)(1),
(2) Date: Dec. 31, 2019

(87) PCT Pub. No.: WO2019/007870
PCT Pub. Date: Jan. 10, 2019

(65) Prior Publication Data
US 2020/0156665 A1  May 21, 2020

(30) Foreign Application Priority Data
Jul. 4, 2017 (AT) ................ A50550/2017

(51) Int. Cl.
*B61B 12/06* (2006.01)
*H04W 4/80* (2018.01)
*B61B 7/00* (2006.01)
*B61B 12/04* (2006.01)

(52) U.S. Cl.
CPC ............. *B61B 12/06* (2013.01); *B61B 7/00* (2013.01); *B61B 12/04* (2013.01); *H04W 4/80* (2018.02)

(58) Field of Classification Search
CPC ........... B61B 7/00; B61B 12/04; B61B 12/06; H04W 4/80
See application file for complete search history.

(56) References Cited

FOREIGN PATENT DOCUMENTS

| AT | A14262002 A | 1/2004 | |
|----|-------------|--------|---|
| AT | 411982 B * | 7/2004 | ............. B61B 12/04 |
| EP | 1837264 A2 | 9/2007 | |
| EP | 2147843 A1 | 1/2010 | |
| JP | H0257923 A | 2/1990 | |

(Continued)

OTHER PUBLICATIONS

International Preliminary Report on Patentability Application No. PCT/EP2018067744 Completed: Oct. 2, 2019 11 Pages.

(Continued)

*Primary Examiner* — Robert J McCarry, Jr.
(74) *Attorney, Agent, or Firm* — Husch Blackwell LLP

(57) ABSTRACT

In order to be able to more reliably assess and react to the potential hazard when a vehicle of a cable car enters a station of the cable car, it is provided that the deflection of the vehicle before the station entrance is measured by the sensor and transmitted to the cable car control unit, that at the same time the occurrence of a wind gust before the station entrance is detected by the cable car control unit and that the cable car control unit controls a cable car drive as a function of the transmitted deflection and of the detected wind gust.

12 Claims, 2 Drawing Sheets

(56) References Cited

FOREIGN PATENT DOCUMENTS

JP          2006335076 A    12/2006
WO             9530216 A1   11/1995

OTHER PUBLICATIONS

International Search Report and Written Opinion of the International Searching Authority Application No. PCT/EP2018/067744 Completed: Sep. 28, 2018; dated Oct. 12, 2018 13 Pages.

\* cited by examiner

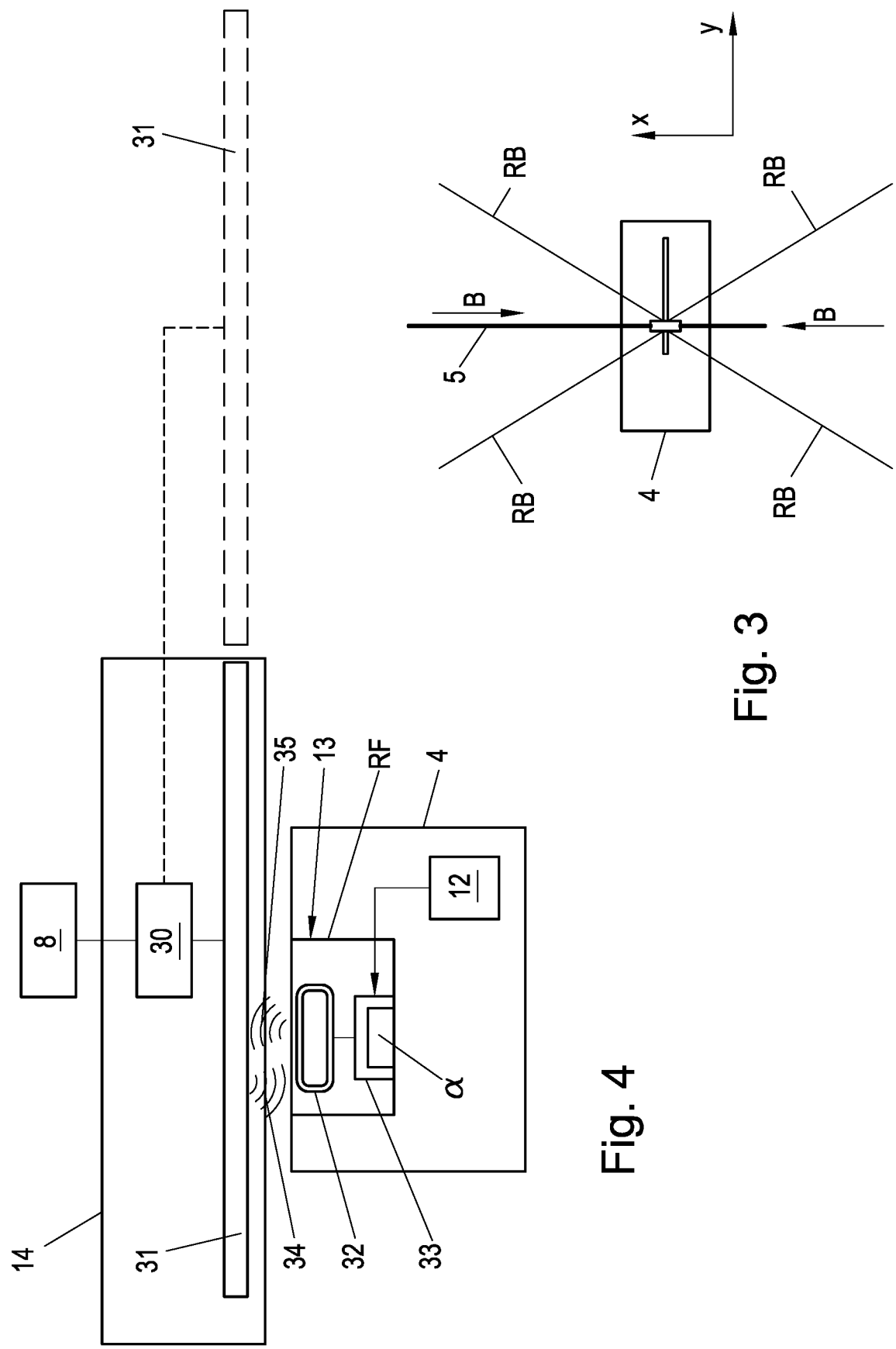

CABLE CAR AND METHOD FOR OPERATING A CABLE CAR

TECHNICAL FIELD

The present teaching relates to a method for operating a cable car with which a number of vehicles hanging on a hoisting cable are moved between at least two stations and with which the deflection of the vehicle from the vertical is measured with a sensor on at least one vehicle of the cable car. Furthermore, the present teaching relates to a corresponding cable car.

BACKGROUND

A cable car with vehicles hanging on a revolving cable, whether permanently coupled or detachably coupled, is subject to special safety requirements. This is especially true, but not exclusively, for cable cars for carrying people. A safety risk is the swinging motion of a vehicle, because it can lead to a collision of the vehicle with stationary facilities of the cable car, such as a cable car tower, with overhead lines for energy and/or data transmission extending between the cable car towers, or with a component at a station entrance, or with other vehicles. In the worst case, it may occur that the vehicle gets pulled off the cable and crashes or that the cable derails. The swinging motion of the vehicle is usually caused by the application of external forces to the vehicle, such as wind or the deliberate rocking of the vehicle caused by passengers. But even one-sided loading of the vehicle, especially in combination with wind, can lead to the swinging motion of the vehicle.

The monitoring of the swinging motion of the vehicles is usually the responsibility of the operating staff of the cable car, which must assess whether critical swinging movements of the vehicles during operation of the cable car may occur or not. If necessary, the operating staff has to reduce the cable speed, or to stop the cable car completely. The operating staff are usually provided with the measured values of wind sensors arranged along the route. However, it is in the rarest cases that the entire cable car route is visible for the operating staff and also the climatic conditions (e.g. fog, snow, rain, etc.) or the lighting conditions (e.g. dusk, night, etc.) can affect the view. In addition, a wind sensor detects only the wind conditions in the immediate vicinity of the wind sensor, but cannot provide any information regarding the wind at another point of the cable car. Therefore, it is necessary that wind sensors are attached at all neuralgic positions (e.g. exposed cable car towers) of the cable car, which increases costs. Usually there are requirements for the operating staff to reduce the transport speed if the wind speed exceeds a certain level, or to completely discontinue the operation of the cable car. This, of course, is a very conservative approach, which sometimes leads to a reduction in the transport speed or even stops the cable car, although this is not absolutely necessary.

Consequently, measures to make the monitoring of the swinging motion of vehicles safer and more reliable have already become known.

EP 1 837 264 A2 describes the use of inclination sensors on the vehicles to detect the deflection of a vehicle from a vertical. The measured values of the inclination sensors are transmitted via a transmitter on the vehicle either via relay stations on the cable car towers or directly to a receiving station of a station. In case of excessive deflections either the speed is reduced or the cable car stopped.

AT 411 982 B also describes the use of inclination sensors on the vehicles to detect the deflection of a vehicle. In addition, the detection of the wind speed and wind direction is provided on the vehicle. The recorded data are evaluated and stored in the vehicle itself. When a vehicle passes through a station, the collected data can also be transmitted to a receiver and can be used to control the cable car.

Also in WO 95/30216 A1, the deflection of a vehicle is detected by means of an inclination sensor on the vehicle. In addition, each vehicle includes a unique identifier. The vehicle transmits the inclination information and the identifier to a receiver on a cable car tower, which forwards the inclination information and the identifier to a cable car control unit for evaluation.

A particular danger point is the entrance to a station of the cable car, since many stationary facilities are located near the vehicles. In addition, so-called outer guide rail trumpets are usually arranged in the area of the entrance to the station, in which the detachable grip of the vehicle on the cable is to enter for guidance. With strong deflections of the vehicle at the station entrance, it may happen that the outer guide rail trumpet is missed, which can lead to massive damage to the cable car and/or the vehicle or even to the vehicle being pulled off the cable. Swinging motion detection at the entrance to a station is therefore particularly critical and it is up to the operator of the cable car to ensure that there will be no critical situations during operation of the cable car, for example by the operating staff monitoring the information provided by the wind sensors arranged along the cable car.

EP 2 147 843 A1 proposes to detect the swinging movement of a vehicle before the station entrance by means of a sensor in the station, in particular a laser scanner or a camera, with which the distance of the vehicle to the station is detected at the same time, in order to control the cable car drive depending on the swinging movement. Thus, a swinging movement of the vehicle transversely to the direction of travel before the station can be reliably detected. A detection of a potential hazard at the entrance of the vehicle in the station is not possible. For example, if the vehicle is approaching the station in an inclined position without swinging movement, the control device would not react.

SUMMARY

It is therefore an object of the present teaching to provide a method by which the potential hazard at the entrance of a vehicle in the station of a cable car can be assessed more reliably and reacted to accordingly.

This object is achieved in that the deflection of the vehicle is measured with the sensor before the station entrance and transmitted to the cable car control unit, in that at the same time the occurrence of a wind gust before the station entrance is detected by the cable car control unit and that the cable car control unit controls a cable car drive as a function of the transmitted deflection and the detected wind gust. In this way, the cable car control unit can not only detect and evaluate a current deflection of a vehicle, but can now also consider the occurrence of wind gusts when the cable car drive is controlled. It was recognized that above all the combination of the deflection and the wind gust before or in the area near the station entrance gives rise to a considerable potential hazard, which can now be recognized in time. The cable car control unit can now react in time to such a potential hazard and reduce, for example, the driving speed of the cable car.

By additional detection of the direction of the wind gust the cable car control unit is enabled to respond even better to a potential hazard, because not every wind gust from any direction is equally dangerous. Therefore, in an advantageous embodiment, only wind gusts from a defined direction can be taken into account or wind gusts from different directions can be considered differently.

In order to still allow an emergency stop of the vehicle before the station entrance, it is preferably provided that the deflection of the vehicle and the occurrence of the wind gust, and possibly also the direction of the wind gust, are detected by the cable car control unit at a distance before the station entrance, which is larger than the braking distance of the vehicle.

In a particularly advantageous embodiment, a radio transponder is provided on the vehicle as transmitting device and the receiver is designed as a reader for the radio transponder. Radio transponders are small, compact components that can be easily arranged on the vehicle. If the radio transponder is embodied in a particularly advantageous embodiment as a passive radio transponder, an independent power supply of the vehicle can be omitted, because the vehicle can then be supplied with electrical energy via the radio transponder. For this purpose, the reader can emit a polling signal via a transmitting antenna, which the radio transponder receives and uses to obtain the electrical energy for operating the radio transponder and the sensor.

BRIEF DESCRIPTION OF THE DRAWINGS

The present teaching is described in greater detail below with reference to the FIGS. 1 to 4, which show advantageous embodiments of the present teaching in an exemplary, schematic and non-limiting manner. In the figures:

FIG. 3 shows the use of directional ranges in the evaluation of the wind gusts, and FIG. 4 the use of a radio transponder for transmitting the deflection to the cable car control unit.

DETAILED DESCRIPTION

Figure 1:
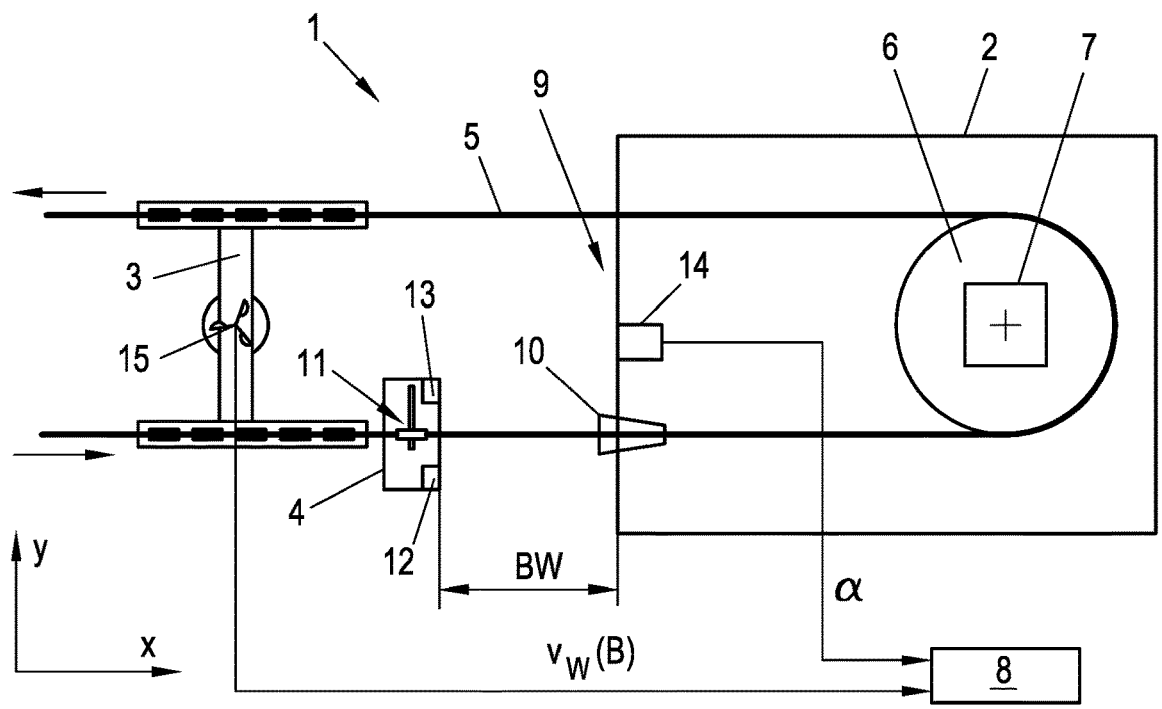
FIG. 1 shows a station area of a cable car with monitoring of the deflection of a vehicle.

FIG. 1 shows a station 2 of a cable car 1 and a part of the transport route of the cable car 1 with a cable car tower 3 before the station entrance. Vehicles 4 of the cable car 1 are transported by means of a hoisting cable 5, which is turned round in the stations 2 via cable pulleys. One cable pulley 6 is driven by a cable car drive 7, wherein the cable car drive 7 is controlled by a cable car control unit 8. At the station entrance 9, an outer guide rail trumpet 10 may be arranged, in which the detachable grip 11 of the vehicle 4 is to enter in order to guide the vehicle 4 into the station 2. For the present teaching, it is irrelevant whether the vehicles 4 are permanently coupled to the hoisting cable 5, or whether the vehicles 4 can be coupled to the hoisting cable 5 (for example by means of well-known detachable grips). Likewise, it is irrelevant for the present teaching whether persons and/or material are transported by the cable car 1. A number of support cables between the stations on which the vehicles 4 are moved may also be provided.

On a vehicle 4, a sensor 12 for detecting the deflection of the vehicle 4 from a vertical is arranged. Above all, the deflection α in the direction y transverse to the transport direction x (FIG. 2) is of interest. But also the largest deflection α, which does not necessarily occur in the transverse direction y, could be detected. Any suitable sensor is may be used for this purpose, for example a position sensor or an acceleration sensor. In the case of an acceleration sensor, the values supplied by the sensor 12 at a specific sampling rate are written to a memory on the vehicle 4, for example. With these values, it is then always possible to deduce a current deflection α.

With the sensor 12, the deflection a is generally detected and transmitted to the cable car control unit 8. This is preferably done with a wireless communication connection, such as radio. For this purpose, a transmitting device 13 can be provided on the vehicle 4, which transmits the detected deflection α of the vehicle 4 to a receiver 14 in the station 2 or in the area near the station 2. The receiver 14 is connected to the cable car control unit 8 and forwards the received signal or the information transmitted therein to the cable car control unit 8.

In addition, the occurrence of wind gusts B is detected before the station entrance 9. For this purpose, for example, a wind sensor 15 may be provided before the station entrance 9, for example at the last cable car tower 3 before the station 2. The wind sensor 15 transmits the detected values to the cable car control unit 8 via a suitable communication connection. For this purpose, a wired or wireless communication connection can be provided. For example, in the case of a wireless communication connection, the wind sensor 15 could send its values via radio to the receiver 14 in the station 2. The wind sensor 15 measures either the wind speed $v_w$ or directly wind gusts B. Wind gust B is understood to be the temporal change of the wind speed $v_w$. If the wind speed $v_w$ is detected, a value for the wind gust B can be obtained by time derivative $$B = \frac{dv_w}{dt}.$$

This can also be done in the cable car control unit 8. In principle, a wind sensor 15 for detecting the wind speed $v_w$ or a value for a wind gust could also be provided on the vehicle 4, whereas substraction of the airstream of the vehicle 4 would be advantageous. In this case, the wind speed $v_w$ or the value for the wind gust could also be sent with transmitting device 13 to the receiver 14 of the station 2 and thus to the cable car control unit 8.

It can also be provided to detect the wind direction with the wind sensor 15. Thus, not only the occurrence of wind gusts B can be detected, but also from which direction R the wind gust B occurs. The direction R of a wind gust B can considerably influence the swinging motion of the vehicle 4. For example, a wind gust B, which acts on the vehicle 4 in the transport direction x along the route, from the front or from behind, may be significantly worse than a wind gust B in the transverse direction y. If a wind gust B hits the vehicle 4 laterally, the deflection in the transverse direction y is directly given, but the contact surface of, for example, a chair as vehicle 4 is very small. However, if a wind gust B hits a chair with an open bubble frontally, the contact surface is much larger, which can also lead to a massive deflection in the transport direction x and transverse direction y.

The cable car control unit 8 can now combine the current deflection α and the occurrence of wind gusts B and can control the cable car drive 7 accordingly. To this end, the direction R of the wind gust B can also be taken into account. It has been found in the operation of a cable car 1 in practice that in particular the combination of deflection α, for example, due to a one-sided loading of the vehicle 4, and the occurrence of wind gusts B in the area of the station entrance 9, possibly as a function of the direction R of the wind gust B, is especially dangerous. In this case, the vehicle 4 does not even have to approach the station entrance 9 while swinging. However, if the vehicle 4 swings on the hoisting cable 5, then the greatest deflection of the swinging movement could be used as a deflection α. At a certain deflection α and when certain wind gusts B occur, large swinging motions of the vehicle 4 in the transverse direction y may occur, which may result in the vehicle 4 touching a stationary component of the station 2 at the station entrance 9 or even missing the outer guide rail trumpet 10. Both can lead to severe accidents and damage to the cable car 1 and/or the vehicle 4. By the inventive combination of the deflection α with the detection of the occurrence of wind gusts B the latter can be effectively prevented.

Figure 2:
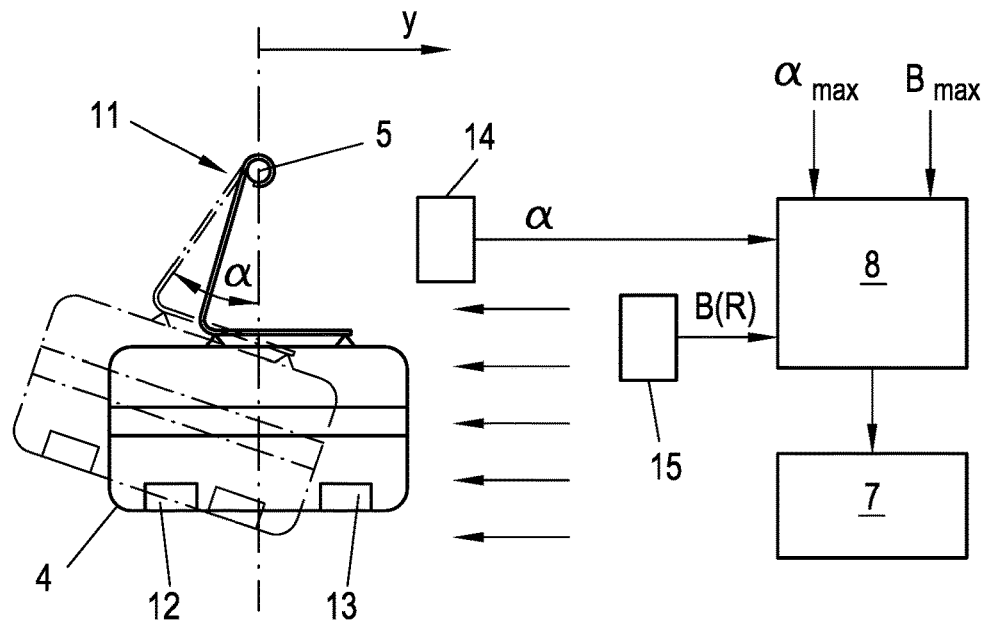
FIG. 2 shows a schematic representation of the procedure according to the present teaching for monitoring the deflection of a vehicle.

It makes sense to specify an allowable deflection $α_{max}$ and an allowable maximum wind gust $B_{max}$ (FIG. 2). If both permissible values are exceeded before the station entrance 9, then for example the cable car drive 7 can be controlled by the cable car control unit 8 in order to reduce the driving speed or to stop the cable car 1. Of course, several thresholds could be defined for the deflection α and/or for the wind gust B. Thus, the current state of the vehicle 4 and the wind at the station entrance 9 can be classified from being less critical to critical. In the case of being less critical, for example, the driving speed is reduced (also possible in several stages) and, in the case of critical conditions, the cable car 1 is stopped. The cable car control unit 8 could of course weight the deflection α and the wind gust B differently, for example in order to take account of special conditions or the design of a cable car 1. The latter, or fixed thresholds, could also be changed in the operation of the cable car 1, in order to consider information acquired during the operation of the cable car.

In addition, the direction R of the wind gust B can also be detected and taken into account in the cable car control unit 8 during the control of the cable car drive 7. For example, for different directions R, or ranges of directions R, different thresholds for the deflection α and/or the wind gust B could be deposited. But it could also be provided to take into account only wind gusts B from a certain direction R, or from a range of directions R. For example, only wind gusts B in the direction of travel x or only wind gusts B in a range of directions RB around the direction of travel x could be taken into account, as shown in FIG. 3. In the cable car control unit 8 the wind gust B could also be weighted differently depending on the direction R, so that critical directions R of wind gusts B are more critical than others. Which wind gusts B with which direction R are taken into account in which manner in the cable car control unit 8 can, of course, be defined and can depend on the cable car type, on the surroundings of the cable car 1, on the operating parameters of the cable car, etc. Of course, this can also be changed during operation of the cable car 1.

The detection of the wind speed $v_w$ or the wind gust B, and optionally the direction R, and the deflection a preferably takes place in such a distance before the station entrance 9, that the vehicle 4 may still be safely braked before the station 2. On the other hand, the detection should not take place at too large a distance before the station entrance 9, because in this case the detected values would no longer have any relevance for the situation of the station entrance 9. Which distance is appropriate, of course, depends on the respective cable car 1. In most cases, the detection will have to be aimed for in a range smaller than 80 m before the station entrance 9. The values of the deflection α and the detection of the wind gust B, and optionally the direction R, are therefore preferably detected at least by the braking distance BW of the vehicle 4 before the station 2 (FIG. 1). The braking distance BW of the vehicle 4 is usually known. In conventional cable cars 1 with maximum travel speeds of typically 7 m/s, the braking distance BW is approximately 25-40 m in the event of an emergency stop. Often there is a cable car tower 3 in this area before the station 2. Thus, the detection of the wind speed $v_w$ or the wind gust B, and optionally the direction R, could occur at a cable car tower 3 before the station 2.

The receiver 14 is therefore preferably arranged such that the transmission range of the transmitting unit 13 is sufficient to be able to receive the deflection α from a sufficiently large distance. Preferably, the receiver 14 is arranged inside the station 2, but could also be arranged in the area of the station 2 before the station entrance 9. For example, the receiver 14 could also be arranged on a cable car tower 3 before the station 2 and be connected to the cable car control unit 8 via a corresponding communication line.

Especially advantageous for the transmission of information from the vehicle 4 to the station 2 is the use of radio transponders RF as a transmitting device 13 on the vehicle 4, such as RFID (Radio Frequency Identification) transponder (often called RFID tag), as is explained by means of FIG. 4. A memory unit 33 is provided in the radio transponder RF on the vehicle 4, in which, for example, values for the deflection α and optionally also values for the wind speed $v_w$ or for wind gusts B, and optionally the direction R, can be stored. The sensor 12 for detecting the deflection α could store its values, for example, in the memory unit 33 of the radio transponder, and a wind sensor 15 could do this as well, if the latter is provided on the vehicle 4. Such a radio transponder RF can have a very small size and can therefore be used very flexibly. In the effective range of a transmitting antenna 31, which transmits a polling signal 34, the radio transponder RF responds with a response signal 35, which comprises the deflection α, and optionally also a value of the wind gusts B and possibly the direction R. The response signal 35 is received by the transmitting antenna 31 and forwarded to a reader 30 which decodes the required values from the response signal 35. The reader 30 is connected to the cable car control unit 8 and can send the obtained values to the cable car control unit 8. A plurality of transmitting antennas 31 can be connected to a reader 30, as indicated in FIG. 4. The receiver 14 in the station 2 could therefore be designed as a reader 30 with a transmitting antenna 31. The transmitting antenna 31 would have to be designed in such a way that the polling signal 34 is transmitted as far from the station 2 to the route that information from the vehicle 4 can be obtained as early as possible.

The supply of a vehicle 4 with electrical energy is cumbersome in practice, because usually an energy storage device must be provided on the vehicle 4 and the energy storage must be charged, for example, during the travel through the station. Therefore, it is often desirable in a cable car 1 not to use an electric power supply on the vehicles 4. This contradicts of course the requirement to detect the deflection α of the vehicle 4 and to transmit the latter to the cable car control unit 8.

In a particularly advantageous embodiment, therefore, a passive radio transponder is used on the vehicle 4, for example a passive RFID transponder, because no power supply of the radio transponder RF on the vehicle 4 is necessary in this case. A passive radio transponder is active only in the effective range of a transmitting antenna 31 of a reader 30 spanning an electromagnetic field, since the passive radio transponder RF acquires the electrical energy to operate from the electromagnetic signal emitted by the transmitting antenna 31, which is received with a receiving antenna 32 in the radio transponder RF. Thus, the sensor 12, and possibly also a wind sensor 15, on the vehicle 4 could receive the required electrical energy from the passive radio transponder RF.

When the vehicle 4 approaches the station 2, the passive radio transponder RF at the vehicle 4 reaches the effective range of the transmitting antenna 31, whereby the power supply is enabled. Then, the sensor 12, and possibly also a wind sensor 15, are read and the detected value of the deflection α, and possibly the occurrence of a wind gust B and a direction R, are sent with the response signal 35 to the reader 30. There are also radio transponders RF with a sensor input, so that a sensor 12, and possibly also a wind sensor 15, can also be connected directly to the radio transponder RF in order to be read out directly via the radio transponder RF.

Of course, other information could also be stored in the memory unit 33 of the radio transponder RF. For example, a unique vehicle identifier FID could be stored in each vehicle 4 in the storage unit 33, which could also be transmitted to the cable car control unit 8.

If the effective range of the transmitting antenna 31 does not reach far enough to poll the information required by the vehicle with a radio transponder RF before the braking distance BW, it could also be provided to arrange the reader 30 with a transmitting antenna 31 outside the station 2, for example, at the last cable car tower 3 before the station 2. The reader 30 may be connected to the cable car control unit 8 or the receiver 14 in the station 2 (wireless or wired) to transmit the values of the deflection α, and possibly also the wind gust B and a direction R.

In addition, values of the deflection a along the route between the stations 2 could also be collected with a radio transponder RF. If a power supply on the vehicle 4 were present, for example, the sensor 12 could be read out at a predetermined sampling rate and stored in the memory unit 33. In the area of the station 2, the memory unit 33 can then be read out and the stored values can be analyzed by the cable car control unit 8. From this, the cable car control unit 8 can obtain important information about the conditions present along the route, which can also be used to control the cable car drive 7. When using a passive radio transponder RF, a reader 30 could be arranged at least on certain cable car towers along the route, whereby the sensor 12, and preferably also the vehicle identifier FID, can be read in the area of the cable car tower. The thus detected sensor value can be stored in the memory unit 33 and/or can be transmitted from the cable car tower to the cable car control unit 8. In the station 2, the storage unit 33 could then be read out with a reader 30. In this case, an electric power supply is required on the cable car tower and possibly also a data connection to the cable car control unit 8.

The communication path between the vehicle 4 and the cable car control 8, i.e. for example, the cable car control unit 8, the reader 30, the transmitting antenna 31, the radio transponder RF, can of course also be designed to be functionally failsafe, for example, according to a required safety integrity level (SIL) in order to ensure safe communication in the sense of functional safety (i.e., in the sense that an error is detected immediately and the system then preferably switches to a safe state). For this purpose, well-known mechanisms, such as a multi-channel hardware, redundancy in the data, error detection and error correction methods in the data transmission, etc., can be provided. For example, a timestamp could be added to each signal 34, 35 or to the data carried therein. If the time bases of the reader 30 and the cable car control unit 8 are synchronized, a deviation of the time stamp to the synchronized control time can be detected and could, e.g., result in a shutdown of the cable car 1. It may further be provided that the memory unit 33 of the radio transponder RF must be read several times within a predetermined period of time in order to verify the transmitted data. The data transmitted in the response signal 35 could be protected by redundant data, for example, by a CRC (cyclic redundancy code). Of course, further measures to ensure the functional safety are also conceivable.

The invention claimed is:

1. A method for operating a cable car with which a number of vehicles hanging on a hoisting cable are moved between at least two stations and on at least one vehicle of the cable car, the deflection of the vehicle from the vertical is measured with a sensor, wherein the deflection of the vehicle is measured with the sensor before the station entrance and transmitted to the cable car control unit, at the same time the occurrence of a wind gust as temporal change of the wind speed is detected by the cable car control unit with a wind sensor arranged on a cable car tower before the station entrance the cable car control unit combines the transmitted deflection of the vehicle and the detected wind gust for controlling a cable car drive as a function of the transmitted deflection and of the detected wind gust.

2. The method of claim 1, wherein the direction of the wind gust is detected by the cable car control unit and is taken into account when controlling the cable car drive.

3. The method of claim 2, wherein only wind gusts from a defined direction are taken into account in the cable car control unit.

4. The method of claim 2, wherein wind gusts from different directions are taken into account in different manners in the cable car control unit.

5. The method of claim 1, wherein the deflection of the vehicle and the occurrence of the wind gust is detected by the cable car control unit at a distance before the station entrance, which is larger than the braking distance of the vehicle.

6. The method of claim 2, wherein the direction of the wind gust is detected by the cable car control unit at a distance before the station entrance, which is larger than the braking distance of the vehicle.

7. The method of claim 1, wherein the deflection of the vehicle is transmitted to the cable car control unit by means of a radio transponder on the vehicle.

8. The method of claim 7, wherein a passive radio transponder is used and the passive radio transponder obtains the electrical energy for transmitting the deflection from a polling signal received by the radio transponder.

9. The method of claim 8, wherein the vehicle obtains the electrical energy for reading out the sensor from the passive radio transponder.

10. A cable car with a number of vehicles hanging on a hoisting cable, which are movable between at least two stations, wherein a sensor for detecting the deflection of the vehicle from the vertical is arranged on at least one vehicle of the cable car, wherein a cable car control unit is provided, which is connected to a cable car drive and controls the cable car drive, and a transmitting device is arranged on the vehicle in order to transmit the deflection of the vehicle measured by the sensor before the station entrance to a receiver in the area of the station, the receiver connected to the cable car control unit and the receiver transmitting the deflection to the cable car control unit, on a cable car tower before the station entrance a wind sensor is arranged which is connected to the cable car control unit and which detects the occurrence of a wind gust, as temporal change of the wind speed, before the station entrance and transmits the detected occurrence of a wind gust to the cable car control and that the cable car control unit combines the transmitted deflection of the vehicle and the detected wind gust for controlling the cable car drive as a function of the transmitted deflection and the detected wind gust.

11. The cable car of claim 10, wherein a radio transponder is provided on the vehicle as the transmitting device and the receiver is designed as a reader for the radio transponder.

12. The cable car of claim 11, wherein a passive radio transponder is provided as the radio transponder, and the reader transmits a polling signal via a transmitting antenna, which is received by the radio transponder and obtains therefrom the electrical energy for operating the radio transponder and the sensor.

* * * * *